US011433775B1

(12) United States Patent
Hinman et al.

(10) Patent No.: US 11,433,775 B1
(45) Date of Patent: Sep. 6, 2022

(54) AIRCRAFT CHARGING UNIT

(71) Applicant: HiveSpot, Inc., Los Gatos, CA (US)

(72) Inventors: Brian L. Hinman, Los Gatos, CA (US); Tabetha L. Hinman, Los Gatos, CA (US)

(73) Assignee: HiveSpot, Inc., Los Gatos, CA (US)

( * ) Notice: Subject to any disclaimer, the term of this patent is extended or adjusted under 35 U.S.C. 154(b) by 75 days.

(21) Appl. No.: 16/920,216

(22) Filed: Jul. 2, 2020

Related U.S. Application Data (60) Provisional application No. 62/870,117, filed on Jul. 3, 2019.

(51) Int. Cl.
| | |
|---|---|
| *B60L 53/00* | (2019.01) |
| *B60L 53/57* | (2019.01) |
| *B60L 53/35* | (2019.01) |
| *B60L 53/302* | (2019.01) |
| *B60L 53/53* | (2019.01) |
| *B60L 53/66* | (2019.01) |
| *B60L 58/22* | (2019.01) |
| *B60L 53/50* | (2019.01) |
| *B60L 53/60* | (2019.01) |
| *H02J 7/34* | (2006.01) |
| *B64D 27/24* | (2006.01) |

(52) U.S. Cl.
CPC ............ *B60L 53/57* (2019.02); *B60L 53/302* (2019.02); *B60L 53/35* (2019.02); *B60L 53/50* (2019.02); *B60L 53/53* (2019.02); *B60L 53/60* (2019.02); *B60L 53/665* (2019.02); *B60L 58/22* (2019.02); *H02J 7/342* (2020.01); *B60L 2200/10* (2013.01); *B64D 27/24* (2013.01)

(58) Field of Classification Search
CPC ........ B60L 53/57; B60L 53/302; B60L 53/35; B60L 53/50; B60L 53/60; B60L 58/22; H02J 7/342
See application file for complete search history.

(56) References Cited

U.S. PATENT DOCUMENTS

| | | | | |
|---|---|---|---|---|
| 6,493,217 | B1 * | 12/2002 | Jenkins, Jr. ............ | A47B 21/00 108/147 |
| 6,741,065 | B1 * | 5/2004 | Ishii ........................ | B60L 53/14 320/122 |
| 7,619,319 | B1 * | 11/2009 | Hunter .................... | B60L 53/57 290/4 R |

(Continued)

FOREIGN PATENT DOCUMENTS

| | | | |
|---|---|---|---|
| CN | 203166584 U | * | 8/2013 |
| CN | 108674678 A | * | 10/2018 |

(Continued)

*Primary Examiner* — Naum Levin
(74) *Attorney, Agent, or Firm* — Sunstein LLP (57) ABSTRACT

A method of charging a battery system of an electrically powered aircraft that is at a location on the ground. The method moves an Aircraft Charging Unit (ACU) to a position proximate to the location, the ACU having a set of storage batteries, a charge controller, and a connection system. The method further couples the set of storage batteries to the battery system through the connection system of the ACU and causes transfer of energy from the set of storage batteries to the battery system under control of the charge controller. The method then decouples the set of storage batteries from the battery system of the aircraft.

24 Claims, 6 Drawing Sheets

(56) References Cited

U.S. PATENT DOCUMENTS

| | | | | |
|---|---|---|---|---|
| 8,183,819 | B2* | 5/2012 | Sugano | B60L 53/14 320/103 |
| 8,299,754 | B2* | 10/2012 | Hayashigawa | B60L 50/30 320/109 |
| 8,963,481 | B2* | 2/2015 | Prosser | B60L 1/006 320/104 |
| 9,056,555 | B1* | 6/2015 | Zhou | B60L 53/35 |
| 9,233,618 | B2* | 1/2016 | Dyer | B60L 3/0023 |
| 9,496,735 | B2* | 11/2016 | Sarkar | H01M 16/00 |
| 9,555,715 | B2* | 1/2017 | Sugano | B60L 50/52 |
| 9,592,742 | B1* | 3/2017 | Sosinov | H02J 50/10 |
| 9,643,729 | B2* | 5/2017 | Walter-Robinson | H02P 4/00 |
| 9,944,192 | B2* | 4/2018 | Ricci | H02J 7/025 |
| 10,014,683 | B2* | 7/2018 | Ellenberger | H05B 45/325 |
| 10,093,189 | B2* | 10/2018 | Sommarstrom | B25J 9/009 |
| 10,093,195 | B2* | 10/2018 | Ricci | B60L 53/12 |
| 10,286,793 | B2* | 5/2019 | Paryani | B60L 53/16 |
| 10,340,709 | B2* | 7/2019 | Dyer | B60L 53/53 |
| 10,373,238 | B2* | 8/2019 | Hill | B60L 53/80 |
| 10,391,873 | B2* | 8/2019 | Kohnke | B60L 53/68 |
| 10,507,733 | B2* | 12/2019 | Blum | B60L 53/14 |
| 10,630,082 | B1 | 4/2020 | Gu et al. | |
| 10,699,305 | B2* | 6/2020 | Ricci | B60W 10/04 |
| 10,717,367 | B1* | 7/2020 | Price | B60L 53/30 |
| 10,906,122 | B2* | 2/2021 | Schraff | B23K 9/0953 |
| 10,926,644 | B1* | 2/2021 | Willson | H02J 7/0021 |
| 11,091,053 | B2* | 8/2021 | Ma | B60L 53/62 |
| 11,267,574 | B2* | 3/2022 | Benson | B60L 53/00 |
| 2010/0060093 | A1* | 3/2010 | Hunter | B60L 8/003 310/89 |
| 2010/0072946 | A1* | 3/2010 | Sugano | B60L 53/51 320/108 |
| 2011/0055037 | A1* | 3/2011 | Hayashigawa | B60L 53/16 705/26.1 |
| 2012/0005031 | A1* | 1/2012 | Jammer | B60L 53/305 705/16 |
| 2012/0074901 | A1* | 3/2012 | Mohammed | B60L 58/15 320/109 |
| 2013/0009469 | A1* | 1/2013 | Gillett | H02J 3/383 307/25 |
| 2013/0020993 | A1* | 1/2013 | Taddeo | B60L 53/16 320/109 |
| 2014/0210399 | A1* | 7/2014 | Urschel | H02J 7/0045 320/107 |
| 2015/0353192 | A1* | 12/2015 | Morrison | B64D 31/06 244/17.23 |
| 2018/0118045 | A1* | 5/2018 | Gruzen | B60L 53/665 |
| 2018/0339601 | A1* | 11/2018 | Kruszelnicki | B60L 53/16 |
| 2019/0092184 | A1* | 3/2019 | Sussman | G05D 1/0225 |
| 2019/0135133 | A1* | 5/2019 | Miller | B60L 53/16 |
| 2019/0190291 | A1* | 6/2019 | Waters | H02J 7/007 |
| 2019/0210479 | A1* | 7/2019 | Bachmann | G05D 1/0225 |
| 2019/0308513 | A1* | 10/2019 | Akhavan-Tafti | B60L 53/32 |
| 2019/0315479 | A1* | 10/2019 | Tillotson | B60L 53/37 |
| 2019/0319480 | A1* | 10/2019 | Cui | H05B 45/375 |
| 2019/0337406 | A1* | 11/2019 | Mingenbach | B60L 53/302 |
| 2020/0010187 | A1* | 1/2020 | Bevirt | B64C 29/0033 |
| 2020/0074575 | A1* | 3/2020 | Efird | B60L 58/10 |
| 2020/0164755 | A1* | 5/2020 | Smolenaers | B60L 53/16 |
| 2020/0346551 | A1* | 11/2020 | Nestel | H02J 1/001 |
| 2020/0361329 | A1* | 11/2020 | Schutz | B60L 53/53 |
| 2021/0031638 | A1* | 2/2021 | Lehmeier | H01M 10/44 |
| 2021/0046844 | A1* | 2/2021 | Bae | B60L 3/0046 |
| 2021/0091587 | A1* | 3/2021 | Nakao | H01M 10/425 |
| 2021/0206499 | A1* | 7/2021 | Balachandran | B64D 35/02 |
| 2021/0281103 | A1* | 9/2021 | Williams | H02J 7/35 |
| 2021/0291692 | A1* | 9/2021 | Masoud | H02J 50/10 |
| 2021/0300195 | A1* | 9/2021 | Vaughan | B60L 53/305 |

FOREIGN PATENT DOCUMENTS

| | | | | |
|---|---|---|---|---|
| CN | 208086039 U | * | 11/2018 | |
| DE | 102017219760 A1 | * | 5/2019 | |
| WO | WO-2019061351 A1 | * | 4/2019 | H02J 7/0003 |
| WO | WO-2019227378 A1 | * | 12/2019 | B60L 50/60 |

* cited by examiner

AIRCRAFT CHARGING UNIT

PRIORITY

This application claims the benefit of U.S. Provisional Application No. 62/870,117, filed Jul. 3, 2019, which is incorporated herein by reference in its entirety.

TECHNICAL FIELD

The present invention relates to charging batteries that power electric aircraft.

BACKGROUND ART

Electric aircraft, typically powered by Lithium Ion batteries, have begun to displace fuel-burning aircraft. The benefits of electric aircraft include: (a.) reduced operating expenses, (b.) higher reliability, (c.) lower noise, and (d.) reduced environmental impact. As with electric automobiles, electric aircraft are most often recharged from a connection to the alternating current (AC) power grid. Unlike electric automobiles, however, electric aircraft do not generally carry the AC-to-DC charging electronics onboard the vehicle itself, because weight is a critical consideration with aircraft design. Consequently, during the early period of electric aviation, the airframe manufacturers have found it necessary to develop proprietary offboard AC-to-DC charge solutions. Direct current (DC) fast charging of aircraft would be highly desirable, and automotive fast-charge companies have expressed their interest in addressing the aviation application with stationary DC chargers similar to those offered along major highways.

For aviation applications, there are problems with both off-board AC charging solutions as well as stationary DC fast-charging solutions. AC charging time is limited by the power availability at the facility. Typical "Level 2" automobile chargers operate at 220 VAC with up to 70A power draw, which is a practical limit for residential and small business service. An individual aircraft owner might have this grade of service available in their hanger. Level 2 charging translates to a charge time of about 5 hours for an electric aircraft carrying four passengers, as an example, because such aircraft will typically have a battery with roughly 80 kWh of capacity.

DC fast charging allows an aircraft to charge in less than one hour. However, the power requirements for the "supercharging" systems, approaching megawatt levels, often means that the transformer and secondary power lines feeding the facility would need to be upgraded. An additional consideration is the high cost of the DC fast charging systems themselves, and the time and cost of construction. Moreover, the location of stationary fast charging systems may not be convenient to where aircraft need to be parked on an airfield. The high-power levels and airfield safety considerations make extension cords impractical over long distances, requiring large conductors in underground conduits to reach convenient locations, which is yet another cost consideration.

Stationary chargers for electric automobiles have existed for many years, especially those supplying AC power to the vehicle. The automobile typically has an onboard charge controller that converts AC to DC, then modulates the voltage and current to the onboard batteries. More recently, DC superchargers have become available, most notably the courtesy superchargers installed by Tesla along major highways. When an automobile is supercharged, the onboard battery controller is effectively bypassed, and the external DC supercharger is responsible for applying the proper high-voltage DC power to charge the onboard battery pack as quickly as feasible. Of note, each battery chemistry has limitations on the rate at which it can be charged and discharged, and the DC supercharger must observe these limitations to avoid damage to the batteries.

There are instances when electric automobile operators misjudge the energy required to reach their charging destination, thus finding themselves with a drained battery by the side of the road. To service this need, roadside assistance companies have developed emergency recharge trucks that travel to the stranded motorist, then provide sufficient energy to reach the next charging location. Such emergency vehicles have batteries to store the energy, and an inverter to create AC power, which is then applied to the AC charging port on the electric vehicle. Mobile emergency recharge trucks have not been developed with DC charging capability, however. The cost of an emergency recharge truck can be high since it includes not only the cost of the charging equipment but the cost of the truck itself.

Various types of Ground Support Equipment (GSE) are used at airports to support the operation of aircraft between flights. One such type of equipment is the Ground Power Unit (GPU). For traditional aircraft powered by aviation gasoline or jet fuel, there is a need to power air conditioning, engine heating, starter motors, lighting, and electronics while the airplane engines are turned off. While most aircraft have Auxiliary Power Units (APUs) onboard, used to provide power inflight, it is often more cost effective and quieter to utilize a GPU while on the ground, when available. GPUs come in a variety of sizes, some providing DC power, such as 28 VDC, and others providing AC power, such as 115 VAC at 400 Hz. Larger GPUs to service commercial airliners usually create power with a diesel generator, while very small GPUs may have onboard batteries as the source of energy for the aircraft. Still other GPUs are connected to the AC grid, serving as a power conversion device. The industry refers to power conversion GPUs as "rectifiers."

SUMMARY OF THE EMBODIMENTS

In accordance with one embodiment of the invention, there is provided a method of charging a battery system of an electrically powered aircraft that is at a location on the ground. The method includes moving an Aircraft Charging Unit (ACU) to a position proximate to the location. The ACU having a set of storage batteries, a charge controller, and a connection system. The method also includes coupling the set of storage batteries of the ACU to the battery system through the connection system of the ACU and causing transfer of energy from the set of storage batteries to the battery system under control of the charge controller. The method further includes decoupling the set of storage batteries of the ACU from the battery system of the aircraft.

Optionally, the set of storage batteries is an array of cells configured in arrangements selected from the group consisting of in parallel, in series, and combinations thereof. Optionally, the set of storage batteries is configured within a battery sub-system of the ACU, the sub-system having a battery management unit (BMU) configured to manage functions related to a process, pertaining to the set of storage batteries, the process selected from the group consisting of charging, discharging, and combinations thereof, the functions including: (i) monitoring overall voltage, state of charge, and temperature of the set of storage batteries, and (ii) balancing cell charge of each battery of the set of storage batteries. Optionally, the ACU has an input charge controller that controls charging of the set of storage batteries, and the charger controller has: a fast charge bypass that controls charging the set of storage batteries using DC power received from an external DC fast charger; and a charge controller that controls charging the set of storage batteries using AC power received from an external AC power grid.

Optionally, the ACU has a CPU operatively coupled to components of the ACU. Alternatively or additionally, the CPU is coupled to a set of wireless modems configured to communicate with network devices and services. Optionally, the ACU has user controls that include a component selected from the group consisting of a keypad, touch screen, display, scanner, credit card reader, and combinations thereof. Optionally, the set of storage batteries includes lithium ferrophosphate (LFP) batteries. Optionally, the connection system includes a liquid-cooled cable to transfer the energy from the set of storage batteries to the battery system. Optionally, the ACU is further configured to move autonomously to a position proximate to the location. Optionally, the coupling and the decoupling of the set of storage batteries to the storage system, through the connection system, is performed robotically. Optionally, the ACU has, on its top surface, a set of status lights.

In accordance with another embodiment of the invention, there is provided an ACU, for charging a battery system of an electrically powered aircraft that is at a location on the ground. The ACU is an assembly. The assembly includes a cart having a set of wheels, a set of storage batteries mounted on the cart, and a charge controller coupled to the set of storage batteries. The assembly also includes a connection system, coupled to the set of storage batteries and configured to be coupled to the battery system of the electrically powered aircraft for transfer of energy from the set of storage batteries to the battery system, so that the assembly can be readily transported to a position proximate to the location for transferring energy from the set of storage batteries to the battery system.

Optionally, the set of storage batteries is an array of cells configured in arrangements selected from the group consisting of in parallel, in series, and combinations thereof. Optionally, the set of storage batteries is configured within a battery sub-system of the ACU, the sub-system having a battery management unit (BMU) configured to manage functions related to a process, pertaining to the set of storage batteries, the process selected from the group consisting of charging, discharging, and combinations thereof, the functions including: (i) monitoring overall voltage, state of charge, and temperature of the set of storage batteries, and (ii) balancing cell charge of each battery of the set of storage batteries. Optionally, the assembly includes an input charge controller that controls charging of the set of storage batteries, and the charger controller has: a fast charge bypass that controls charging the set of storage batteries using DC power received from an external DC fast charger; and a charge controller that controls charging the set of storage batteries using AC power received from an external AC power grid.

Optionally, the assembly includes a CPU operatively coupled to components of the ACU. Alternatively or additionally, the CPU is coupled to a set of wireless modems configured to communicate with network devices and services. Optionally, the ACU has user controls that include a component selected from the group consisting of a keypad, touch screen, display, scanner, credit card reader, and combinations thereof. Optionally, the set of storage batteries includes lithium ferrophosphate (LFP) batteries. Optionally, the connection system includes a liquid-cooled cable to transfer the energy from the set of storage batteries to the battery system. Optionally, the ACU is further configured to move autonomously to a position proximate to the location. Optionally, the connection system is configured to be coupled and decoupled robotically from the set of storage batteries to the battery system. Optionally, the assembly has, on its top surface, a set of status lights.

DETAILED DESCRIPTION OF SPECIFIC EMBODIMENTS

Definitions.

An "electrically powered aircraft" is an aircraft deriving motion from battery power.

A "battery system" of an electrically powered aircraft is a storage system on board an electrically powered aircraft that stores electrical energy used by the aircraft in deriving motion.

An "Aircraft Charging Unit" (ACU) is a device, configured for transport, that includes a storage battery, a charge controller, and a connection system that is configured to be coupled to a battery system of an electrically powered aircraft in a manner as to charge the battery system under control of the charge controller.

A "cart having a set of wheels" is a wheeled vehicle, which can but need not be powered by an engine, configured to transport cargo, which may be equipment.

A "set" includes at least one member.

Figure 1:
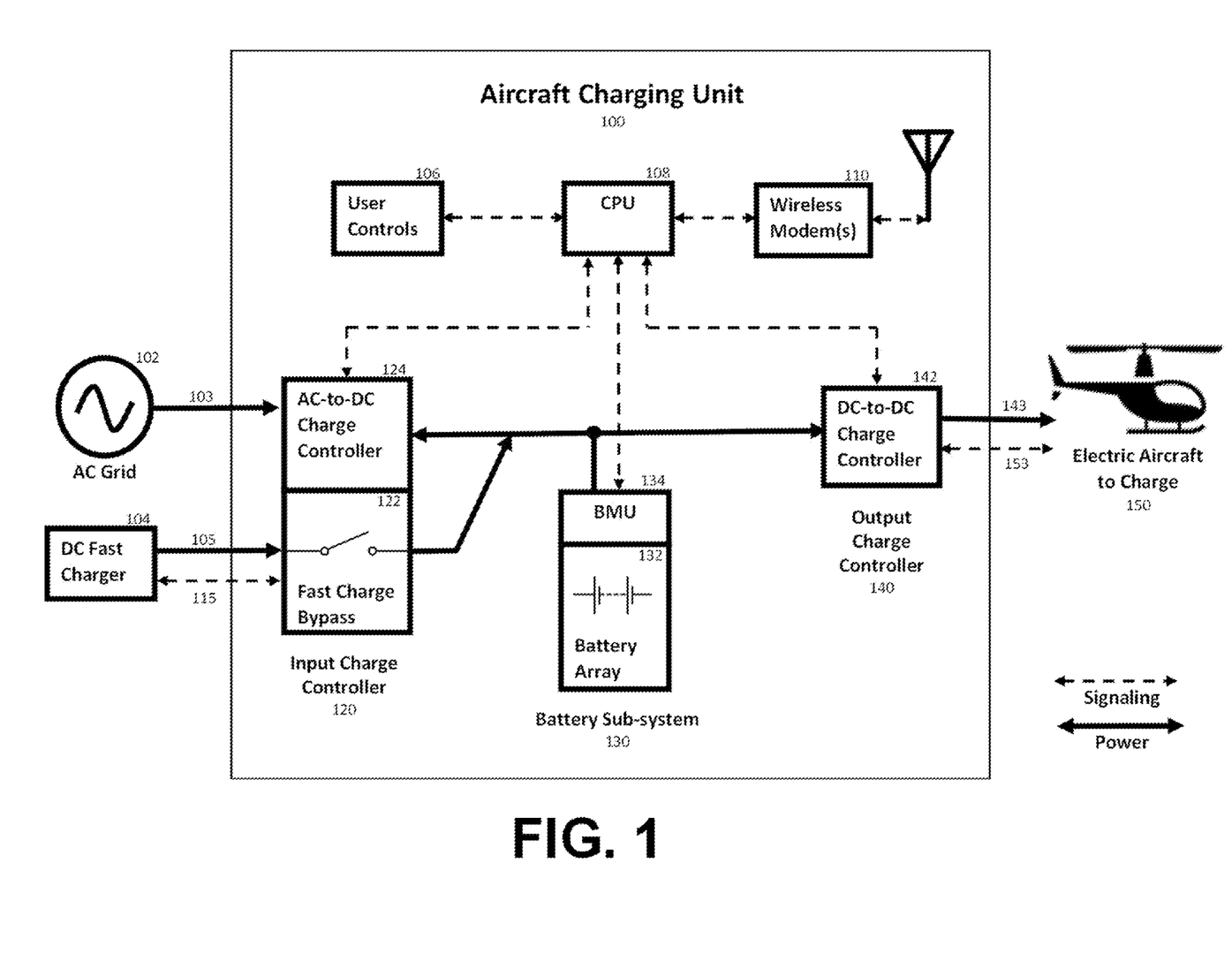
FIG. 1 is a block diagram of the components of an Aircraft Charging Unit (ACU), in accordance with an embodiment of the present invention.

FIG. 1 is a block diagram of the components of an ACU 100, in accordance with an embodiment of the present invention. The ACU 100 of FIG. 1 is a new category of equipment for fast direct-current (DC) charging of electric aircraft. The ACU provides a cost-effective means to DC fast charge an aircraft, while at the same time addressing the logistical issue of moving the charger to be convenient to the parking location of an aircraft.

The ACU 100 is configured with a battery sub-system 130 that includes a battery array 132 capable of holding the energy required to electrically charge at least one aircraft. The battery sub-system 130 also includes a battery management unit (BMU) 134 that manages functions related to the charging and discharging of the battery array 132.

The ACU 100 is also configured with input power connections 103, 105, through which the battery array 132 is recharged from an external power source. The battery array 132 is charged in a manner similar to an electric automobile, through either the connection 103 to an AC power grid 102 (Level 1 or 2 charging), or the connection 105 to a stationary DC fast charger 104 (Level 3 charging). The ACU 100 is configured with an input charge controller 120 that controls the charging of the battery array 132 with power received over the connections 103, 105. As shown in FIG. 1, the input charge controller 120 is in communication with the charger 104 over a signaling path 115. The charger 104 queries the battery sub-system 130 to be charged, over the signaling path 115, requesting the charging capabilities, etc., and the charger 104 is bound to provide charging in accordance with such request. The BMU 134 provides, as one of its functions, a fail-safe in case the charger 104 does not follow such request.

The input charge controller 120 includes a fast charge bypass 122, which controls charging the battery array 132 with DC power received, over the connection 105, from the DC fast charger 104. The input charge controller 120 also includes an AC-to-DC charge controller 124, which converts alternating current from connection 103, from the AC grid 102, to direct current in a modulated form to charge battery array 132.

The ACU 100 also has an output power connection 143 to an aircraft 150, which is used by the ACU 100 to fast charge the aircraft 150 with DC power from the battery array 132. The ACU 100 is configured with an output charge controller 140 that controls the charging, over connection 143, of the connected aircraft 150. As shown in FIG. 1, the output charge controller 140 is in communication with the aircraft 150 over a signaling path 153. The output charge controller 140 includes a DC-to-DC charge controller 142 for regulating the voltage and current applied to the batteries contained within the connected aircraft.

The ACU 100 further includes a Central Processing Unit (CPU) 108 that controls the functionality of the input charge controller 120, battery sub-system 130, and output charge controller 140. The CPU 108 is operatively coupled to one or more wireless modems 110 that connect the CPU 108 to cloud services or any other network device or service. The ACU 100 also includes user controls 106, such as a keypad, touch screen, display, scanner, credit card reader, etc. for a user to provide information to the ACU 100, and to provide information to the user.

Once battery array 132 is charged, either fully or partially, the ACU 100 can be moved, as necessary, to be in proximity to an aircraft requiring recharge. Through a digital handshake of capabilities over signaling path 153 with the aircraft, the ACU 100 applies the proper DC voltage and current to safely charge the aircraft battery as quickly as feasible.

The battery array 132 inside the ACU can be charged slowly (Level 1 and 2 AC charger) or quickly (Level 3 DC charger), depending upon the availability of power at a given location.

Figure 2:
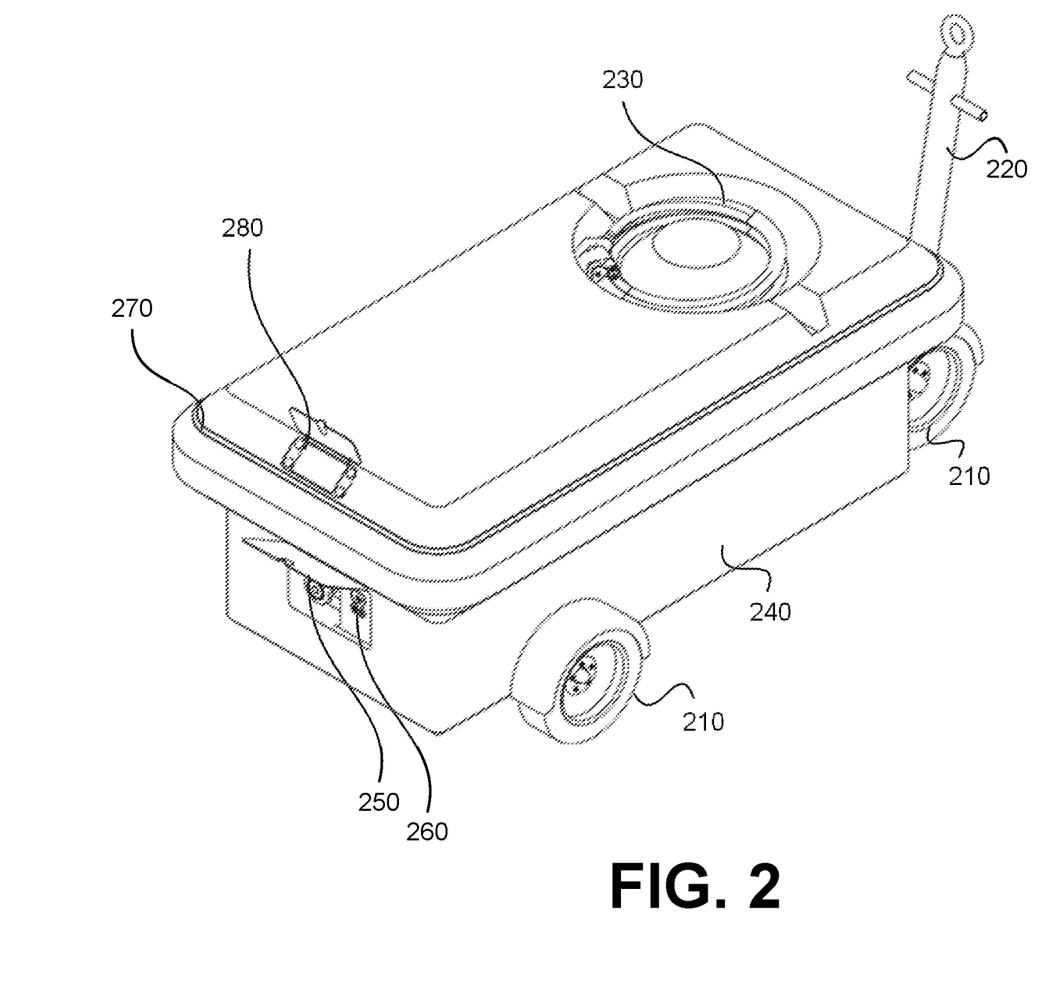
FIG. 2 is a rear perspective view of an exemplary ACU of FIG. 1, in accordance with an embodiment of the present invention.

FIG. 2 is a rear perspective view of an exemplary ACU 100 of FIG. 1, in accordance with an embodiment of the present invention. The assembly of FIG. 2 houses the ACU 100 within a chassis 240. The assembly includes a set of wheels 210 and an attachment arm 220 for towing the ACE 100 into position at a location that may be distant from the location where the ACU 100 receives its charge. The assembly also includes an attachable output power connector 230 (e.g., cable) to connect the ACU 100 to an aircraft. In embodiments, the aircraft, parked at a location on the airfield that is convenient for the operator, can be connected, via connector 230, to the ACU 100, and the aircraft brought to its full battery capacity in less than one hour, in some embodiments. Once the aircraft charging is complete, the ACU 100 can be towed back to the location where it can once again be recharged to service another aircraft.

The assembly in FIG. 2 also has two power inlet connectors, one for AC power (e.g., pin-and-sleeve-style connector) 250 and one for DC supercharging (e.g., CCS2 Combo 2) 260. The assembly in FIG. 2 further includes a user interface 280 and a status indicator light 270.

Figure 3:
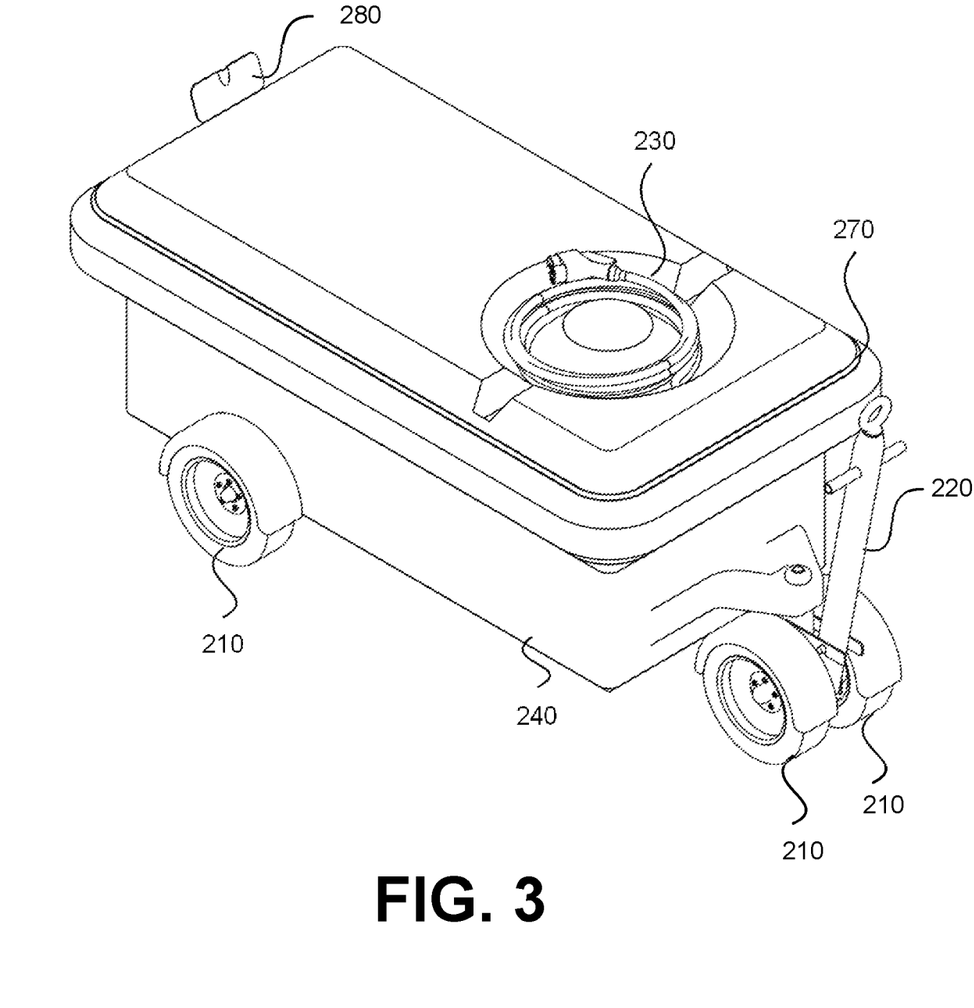
FIG. 3 is a front perspective view of the exemplary ACU of FIG. 2.

FIG. 3 is a front perspective view of the exemplary ACU of FIG. 2.

Figure 4:
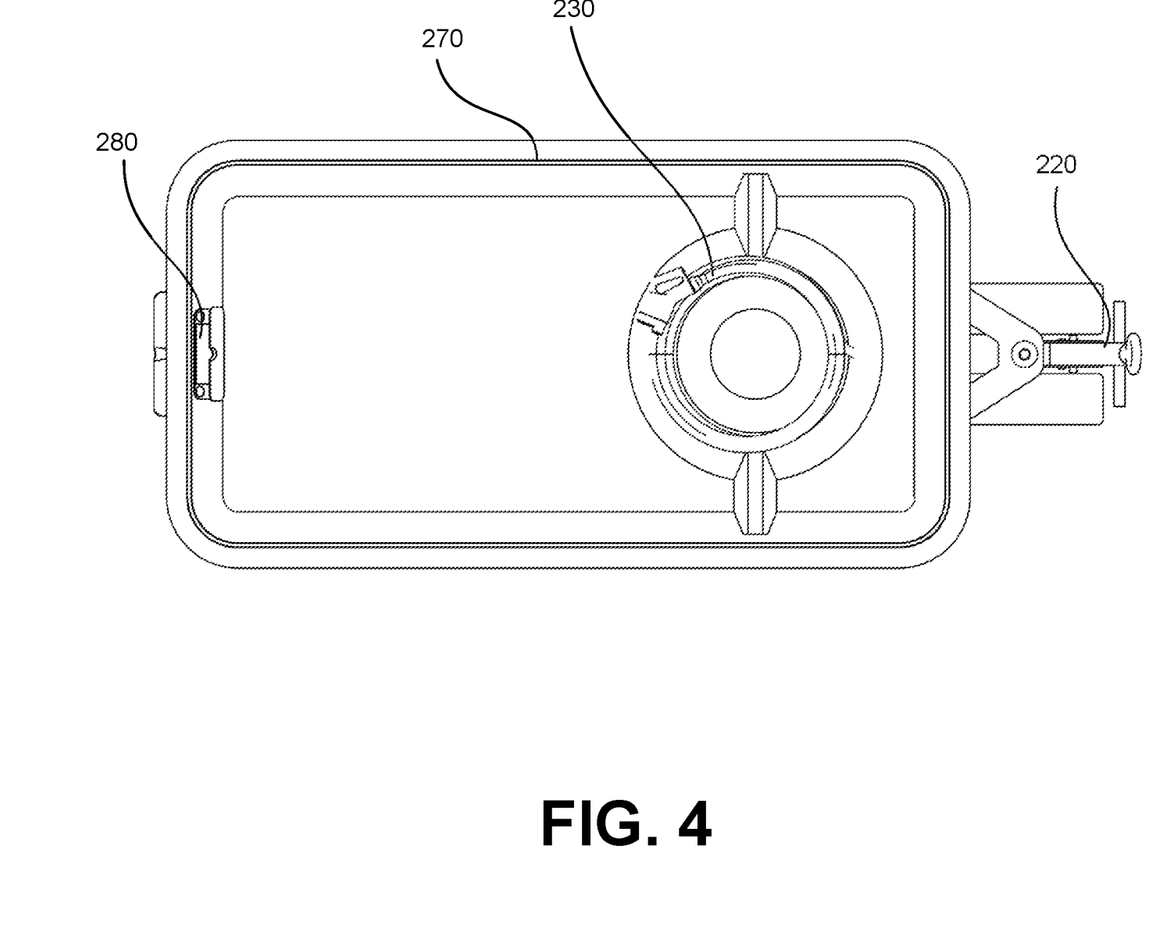
FIG. 4 is a top view of the exemplary ACU of FIG. 2.

FIG. 4 is a top view of the exemplary ACU of FIG. 2.

Figure 5:
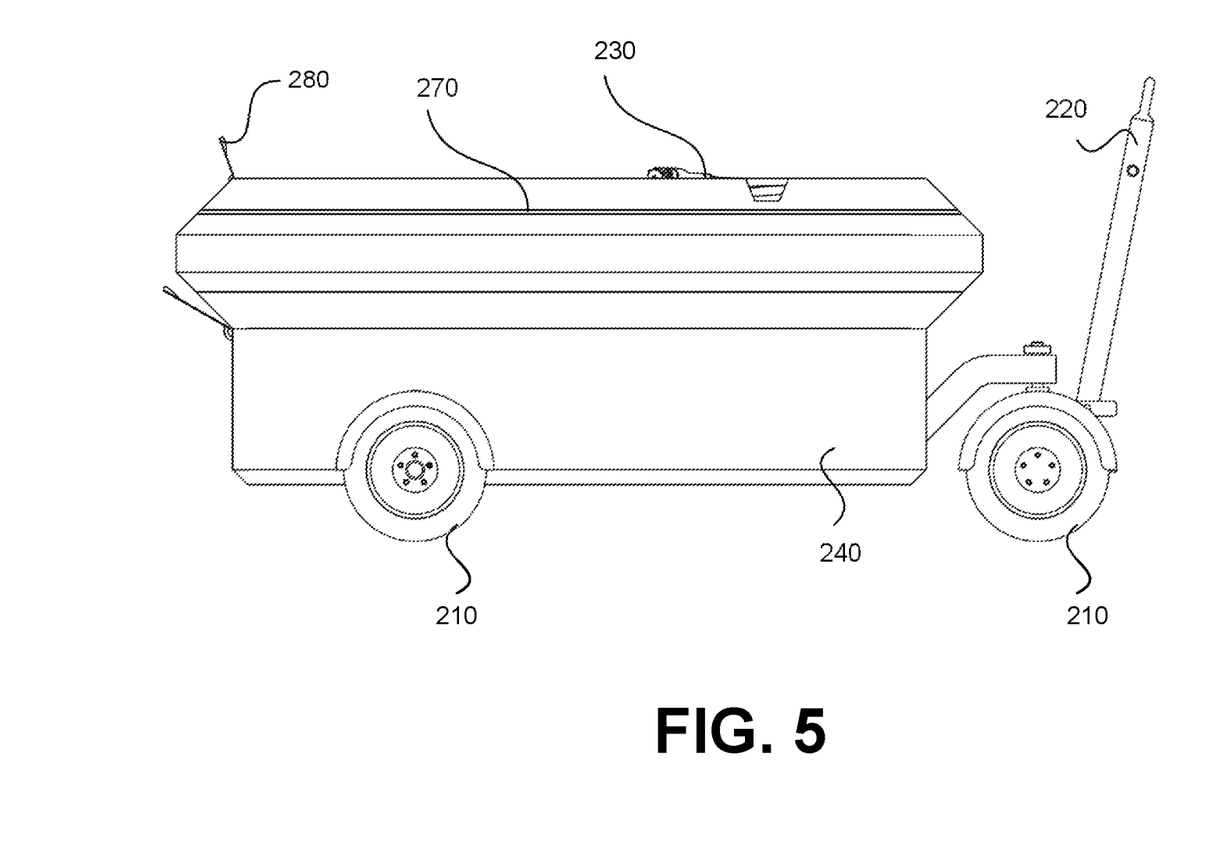
FIG. 5 is a side view of the exemplary ACU of FIG. 2.

FIG. 5 is a side view of the exemplary ACU of FIG. 2.

Figure 6:
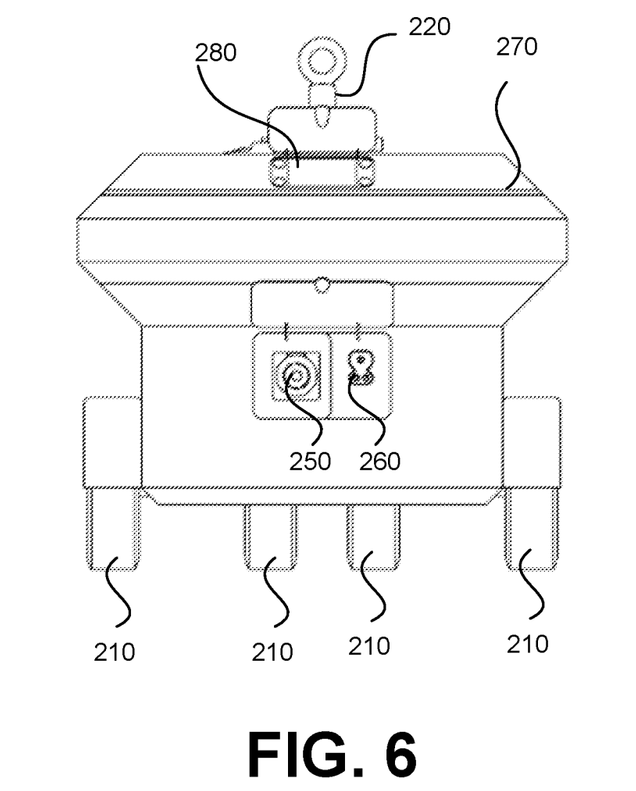
FIG. 6 is a rear view of the exemplary ACU of FIG. 2.

FIG. 6 is a rear view of the exemplary ACU of FIG. 2.

While physically similar to a GPU, the ACU 100 of embodiments of the present invention serves a very different function. While a GPU provides power at a nominally constant voltage and current to operate various electrical devices, the ACU 100 in embodiments of the present invention transfers power from its onboard batteries 132 to the batteries used for propulsion of the aircraft 150, wherein the DC voltage and current are adapted as a function of the battery chemistry, capacity, charge state, and temperature.

In one embodiment, the ACU is configured as a mobile electrical device, which includes a computer, optional onboard user interface, wireless modem, power electronics and batteries, and may be integrated into a Ground Support Equipment (GSE) cart, such as shown in FIG. 2, that can be towed around an airfield by a tug.

In some embodiments, the capacity of the ACU batteries 132 is sufficient to fully charge the majority of electric aircraft operating from airports and vertiports, which is today about 120 kWh of energy. This number will likely rise as battery technology improves. Most aircraft will not require a full charge, however, and "top-off" charging for a few minutes between flights will be common. One reason for top-off charging is to extend battery life, as deep discharging, as well as maximum charging, degrade batteries more quickly than charging within upper and lower bounds of capacity. In the case of top-off charging, the energy within the ACU's batteries 132 may be sufficient to service several aircraft before itself being recharged, especially with some aircraft having only 21 kWh of total battery capacity.

In some embodiments, the batteries 132 onboard the ACU 100 are charged with power electronics (input charge controller 120) very similar to the onboard charger common in electric automobiles. Namely, the ACU 100 may be charged from:

(1) a single-phase AC source, such as 115 VAC at 60 Hz, which the automotive industry refers to as Level 1 charging, (2) a split-phase or three-phase AC source, such as 480/277 volt three-phase power (through power connector 250 or 260), which the automotive industry refers to as Level 2 charging, and (3) a high-powered DC source, such as the "superchargers" deployed by Tesla for electric automobiles (through power connector 260).

The input connector for these three embodiments may be common, such as the Combo 2 connector used for electric vehicles, or each possible power source may have separate connectors for convenience purposes. For the DC fast charging embodiments, a standard signaling path 115 is included with the power connector, as the external power source is responsible for safely charging the batteries in this instance.

The batteries 132 used to store energy within the ACU 100 can be of various types. In one embodiment, batteries 132 have a lithium ferrophosphate (LFP) chemistry. LFP batteries offer much higher energy density than conventional lead-acid batteries, while costs have become very similar. In comparison to other Lithium Ion battery chemistries, such as Lithium Cobalt Oxide (LCO), LFP batteries are safer, because they eliminate the use of cobalt, which has a negative resistance versus increasing temperature property. In extreme situations of discharge or overcharge, LCO batteries can experience thermal runaway, resulting in a fire and potential loss of life. Another important advantage of LFP batteries is the number of charge/discharge cycles compared with other Lithium Ion batteries. Some manufacturers of LFP batteries specify a life of 6,000 cycles, while chemistries such as LCO are limited to 1,000 cycles. The downside of LFP batteries relative to other Lithium Ion chemistries is a lower energy density, although this is not a critical consideration for the ACU application in embodiments of the present invention, where weight is not as important as cost, safety, and cycle life.

The batteries 132 within the ACU 100 are connected as an array of cells, some cells may be in parallel, and some cells may be in series. To achieve the desired high-voltage required to charge the aircraft battery, embodiments include many cells in series, as this increases the array voltage as the number of cells in series times the cell voltage. LFP batteries have a nominal voltage of 3.2V, and a series connection of 190 cells produces a nominal array voltage of 608V, for example. In some embodiments, the voltage of battery array 132 is chosen to exceed the maximum charge voltage of any aircraft 150 that may be charged by the ACU 100. In such embodiments, the cost of the DC charge controller 142 can be minimized by implementing it as a non-isolated controller, which includes two solid-state switches. Because the ACU 100 itself is typically charged more slowly than it is discharged, a boost converter on the ACU's input side, when necessary, is less costly than on the ACU's output side. In other embodiments, the maximum charge voltage of some aircraft 150 that may be charged by the ACU 100 may exceed the voltage of battery array 132. In these embodiments, the DC charge controller is implemented as an isolated DC-to-DC boost converter, which includes six solid-state switches and an isolation transformer.

In the embodiment of FIG. 1, the array of batteries 132 within the ACU 100 is protected by circuitry referred to as a Battery Management Unit (BMU) 134. The BMU 134 serves two important functions. First, it monitors the overall voltage, state of charge, as well as temperature, of the battery array 132. Outside of a safe range of operating conditions, the BMU 134 will limit or prevent charge and/or discharge. For example, batteries have a range of safe operating temperatures, which may differ between the charging state and the discharging state, and the BMU 134 will either slow or halt power transfer if the range is exceeded. The second important function of the BMU 134 is individual cell charge balancing, which is mandatory for Lithium Ion chemistries. When each cell, or group of cells in parallel, reach their maximum specified charge voltage, it is critical to not allow the voltage to increase further, even when other cells in the series array are not yet fully charged. Exceeding the maximum charge voltage can cause permanent cell damage, or potentially result in thermal runaway, particularly for chemistries including Cobalt.

From the energy stored in the batteries 132 onboard the ACU 100, and the aircraft may be charged through the high-power DC charge controller (output charge controller) 140. In another related embodiment, the ACU 100 is configured to augment the energy supplied to the aircraft, while charging the aircraft, with energy from a connection to the grid, if present. In some embodiments, the charge controller 142 is a non-isolated "buck converter," which regulates the voltage and current applied to the batteries contained within the connected electric aircraft 150. The charging power connection 143 is accompanied by a standard signaling path 153 to the battery management unit within aircraft 150. Before and during the charging process, the charge controller 140 uses this signaling path to ensure that the aircraft battery 150 is charged as quickly as feasible, while maintaining safety and avoiding aircraft battery damage.

The Central Processing Unit (CPU) 108 within the ACU 100 controls the functionality of the major power electronic blocks: input charge controller 120, battery sub-system 130, and output charge controller 140. The embodiment of the ACU 100 in FIG. 1 includes one or more wireless modems 110 to connect the CPU 108 with cloud services, or to a personal device within proximity of the ACU 100. The wireless modems 110 may include those capable of wide area network connectivity over 4G or 5G cellular systems, or local area network connectivity via WiFi, as examples. By connecting the CPU 108 to cloud services, the ACU 100 can be managed as part of a broader service offering. For example, if a pilot reserves an ACU 100 at an airport at a specific time, through a cloud-based service, the CPU 108 knows to limit charging by other aircraft within a timeframe that ensures the ACU 100 is available when needed. When the ACU 100 has completed charging an aircraft 150, the cloud service can then alert the pilot to return to the aircraft, as the pilot may have departed the tarmac. When an ACU 100 is no longer connected to an aircraft on the tarmac, the Fixed Base Operator can be alerted, for example, to tow the ACU 100 back to its charging location to ensure it has adequate charge for the next aircraft requiring the ACU 100.

In some embodiments, user controls 106 are included on the exterior of the ACU 100. In some embodiments, a keypad is included that provides a means to control the charging functions in the event of losing cloud connectivity. In some embodiments, a credit card reader is included that allows a user, without an established account, to purchase electric charging. In some embodiments, to assist Fixed Base Operator personnel, the ACU 100 includes a set of status lights 270 on the top or side that visually indicates the state of charge, allowing it to be viewable from many meters away.

In some embodiments, a cable from the ACU 100 is used to transfer power to the aircraft. The cable must be sufficiently long to allow the connection from a conveniently parked location of the ACU 100. Because DC fast charging requires high electrical currents, which may exceed 500A, in embodiments, the wire gauge in the cable must be sufficiently large to avoid unsafe heating. For a long cable with large diameter electrical conductors, the weight becomes prohibitive for human handling. To deal with this issue, DC chargers developed for electric automobiles typically employ glycol/water cooling within the jacket of the cable, allowing a smaller wire gauge without unsafe heating. The heated liquid passes through a small radiator in such chargers to dissipate the heat and lower the liquid temperature. A similar glycol-cooled cable is included in various embodiments of the ACU 100, for example between power connector 230 and chassis 240.

The ACU of embodiments as described offers many advantages over existing solutions for charging electric aircraft:

(1) Fast charging capability even in locations lacking fixed DC fast-charging facilities.

(2) Mobility to bring the charging to the aircraft wherever parked on the airfield.

(3) Reduced peak electricity demand requirements of the airport by smoothing and shifting electrical power usage over time.

(4) Reduced electricity cost by allowing electrical usage to be shifted to lower-rate time periods.

(5) Compact implementation in a modestly sized GSE cart, allowing use without blocking aircraft aisles, a typical issue with fueling trucks or diesel generator trucks.

(6) Utilization of an airport tug shared with other GSE for mobility, saving cost relative to a system with integral powered mobility.

(7) Connection with cloud resources for monitoring and managing as part of an intelligent service offering.

The total cost of charging an electric aircraft must include the human labor to move the ACU 100 into position, return it to its charge location, as well as the use of the tug resource necessary to move the ACU 100. To eliminate these costs, some embodiments of the ACU include robotic mobility. In some embodiments, motorized wheels positioned on the bottom of the ACU 100, in addition to cameras, Lidar or Radar, allow the CPU 108 to intelligently move the ACU 100 about the airfield. Energy from the battery sub-system 130 may be used to power the motors. Much like a robotic vacuum, in some embodiments, the ACU 100 can find its way back to its charging stand once it has been disconnected from an aircraft. Charging contacts on the bottom on the ACU 100 may make an electrical connection with contacts on the charging stand to reliably reconnect the ACU 100 to the grid to restore its energy. When an aircraft operator reserves an ACU for a specific time and place, in some embodiments, the ACU can move off the charging stand, positioning itself at the required location on the airfield, in anticipation of the aircraft arrival.

A more advanced embodiment of the robotic ACU includes the ability to automatically connect to and disconnect from the aircraft to be charged. This additional functionality eliminates the human labor otherwise required. Disconnecting from the aircraft could be a particular problem on unattended airfields, as the aircraft operators may want to leave the field for an extended time after landing. In one embodiment, a robotic arm raises the charging cable into position, lifts a charge door on the aircraft, if necessary, and then inserts the connector on the charge cable into the charge receptacle on the aircraft. Once the aircraft is fully charged, the robotic arm then removes the charge connector from the aircraft, retracts the robotic arm and cable into a stowed position, and then returns to the charging stand. In another embodiment, the ACU rolls under the aircraft, creating an electrical contact between metallic surfaces on the lower portion of the fuselage, and the upper portion of the ACU. This becomes particularly useful once the aircraft industry reaches standardization of contact charge connectors.

Some embodiments of the ACU substitute the external grid charging source for electrical energy generated within the ACU itself. Some embodiments include an internal combustion engine generator, such as a diesel generator, which transfers the electric energy into the ACU batteries using an onboard charge controller. Other embodiments include a hydrogen fuel cell that directly converts pressurized or liquid hydrogen, stored in the ACU, into DC electricity. The output of the hydrogen fuel cell powers a DC-to-DC charge controller, which charges the ACU batteries according to their required voltage and current.

What is claimed is:

1. A method of charging a battery system of an electrically powered aircraft lacking a charge controller and at a location on the ground, the method comprising:
    moving a mobile Aircraft Charging Unit (ACU) to a position proximate to the location on the ground, the ACU having:
        a cart having a set of wheels,
        a set of storage batteries mounted on the cart, and
        a charge controller and a connection system, both coupled to the set of storage batteries;
    coupling the set of storage batteries of the ACU to the battery system through the connection system of the ACU and causing transfer of energy from the set of storage batteries to the battery system in accordance with a charge profile, as to current and voltage applied to the battery system, the charge profile controlled dynamically by the charge controller, which is responsive to parameters selected from the group consisting of battery chemistry, capacity, charge state, temperature and combinations thereof; and
    decoupling the set of storage batteries of the ACU from the battery system of the aircraft.

2. A method according to claim 1, wherein the set of storage batteries is an array of cells configured in arrangements selected from the group consisting of in parallel, in series, and combinations thereof.

3. A method according to claim 1, wherein the set of storage batteries is configured within a battery sub-system of the ACU, the sub-system having a battery management unit (BMU) configured to manage functions related to a process, pertaining to the set of storage batteries, the process selected from the group consisting of charging, discharging, and combinations thereof, the functions including: (i) monitoring overall voltage, state of charge, and temperature of the set of storage batteries, and (ii) balancing cell charge of each battery of the set of storage batteries.

4. A method according to claim 1, wherein the ACU has an input charge controller that controls charging of the set of storage batteries, wherein the input charge controller has a fast charge bypass that controls charging the set of storage batteries using DC power received from an external DC fast charger and is configured to control charging the set of storage batteries using AC power received from an external AC power grid.

5. A method according to claim 1, wherein the ACU has a CPU operatively coupled to components of the ACU.

6. A method according to claim 5, wherein the CPU is coupled to a set of wireless modems configured to communicate with network devices and services.

7. A method according to claim 1, wherein the ACU has user controls that include a component selected from the group consisting of a keypad, touch screen, display, scanner, credit card reader, and combinations thereof.

8. A method according to claim 1, wherein the set of storage batteries includes lithium ferrophosphate (LFP) batteries.

9. A method according to claim 1, wherein the connection system includes a liquid-cooled cable to transfer the energy from the set of storage batteries to the battery system.

10. A method according to claim 1, wherein the ACU is further configured to move autonomously to a position proximate to the location.

11. A method according to claim 1, wherein the coupling and the decoupling of the set of storage batteries to the storage system, through the connection system, is performed robotically.

12. A method according to claim 1, wherein the ACU has, on its top surface, a set of status lights.

13. An ACU according to claim 1, wherein the assembly has, on its top surface, a set of status lights.

14. A mobile Aircraft Charging Unit (ACU), for charging a battery system of an electrically powered aircraft lacking a charge controller and at a location on the ground, the mobile ACU being an assembly comprising:
    a cart having a set of wheels;

a set of storage batteries mounted on the cart;
a charge controller coupled to the set of storage batteries; and
a connection system, coupled to the set of storage batteries and configured to be coupled to the battery system of the electrically powered aircraft for transfer of energy from the set of storage batteries to the battery system;
so that the assembly can be readily transported to a position proximate to the location on the ground for being coupled to the battery system;
wherein the set of storage batteries, the connection system, and the charge controller are configured, when the assembly is coupled to the battery system, to cause transfer of energy from the set of storage batteries to the battery system in accordance with a charge profile, as to current and voltage applied to the battery system, the charge profile controlled dynamically by the charge controller, which is responsive to parameters selected from the group consisting of battery chemistry, capacity, charge state, temperature and combinations thereof.

15. An ACU according to claim 14, wherein the set of storage batteries is an array of cells configured in arrangements selected from the group consisting of in parallel, in series, and combinations thereof.

16. An ACU according to claim 14, wherein the set of storage batteries is configured within a battery sub-system of the ACU, the sub-system having a battery management unit (BMU) configured to manage functions related to a process, pertaining to the set of storage batteries, the process selected from the group consisting of charging, discharging, and combinations thereof, the functions including: (i) monitoring overall voltage, state of charge, and temperature of the set of storage batteries, and (ii) balancing cell charge of each battery of the set of storage batteries.

17. An ACU according to claim 14, wherein the assembly further comprises an input charge controller that controls charging of the set of storage batteries, wherein the input charge controller has a fast charge bypass that controls charging the set of storage batteries using DC power received from an external DC fast charger and is configured to that control charging the set of storage batteries using AC power received from an external AC power grid.

18. An ACU according to claim 14, wherein the assembly further comprises a CPU operatively coupled to components of the ACU.

19. An ACU according to claim 18, wherein the CPU is coupled to a set of wireless modems configured to communicate with network devices and services.

20. An ACU according to claim 14, wherein the ACU has user controls that include a component selected from the group consisting of a keypad, touch screen, display, scanner, credit card reader, and combinations thereof.

21. An ACU according to claim 14, wherein the set of storage batteries includes lithium ferrophosphate (LFP) batteries.

22. An ACU according to claim 14, wherein the connection system includes a liquid-cooled cable to transfer the energy from the set of storage batteries to the battery system.

23. An ACU according to claim 14, wherein the ACU is further configured to move autonomously to a position proximate to the location.

24. An ACU according to claim 14, wherein the connection system is configured to be coupled and decoupled robotically from the set of storage batteries to the battery system.

* * * * *